(12) United States Patent
Vásquez et al.

(10) Patent No.: US 7,895,364 B1
(45) Date of Patent: Feb. 22, 2011

(54) COMPONENT IDENTIFICATION AND TRANSMISSION SYSTEM

(75) Inventors: Alejandro Emilio Vásquez, Raleigh, NC (US); Andrey L. Tsigler, Hillsborough, NC (US); Hassan Elmosallamy Ibrahim Hassan, Apex, NC (US); Katherine Marie McDowell, Raleigh, NC (US)

(73) Assignee: Broadcom Corporation, Irvine, CA (US)

( * ) Notice: Subject to any disclaimer, the term of this patent is extended or adjusted under 35 U.S.C. 154(b) by 755 days.

(21) Appl. No.: 11/252,366

(22) Filed: Oct. 17, 2005

Related U.S. Application Data (60) Provisional application No. 60/619,173, filed on Oct. 15, 2004.

(51) Int. Cl.
*G06F 3/00* (2006.01)
*G06F 15/173* (2006.01)

(52) U.S. Cl. .......................................... 710/2; 709/223

(58) Field of Classification Search ................. 709/223, 709/224, 225, 226; 710/18, 19, 2
See application file for complete search history.

(56) References Cited

U.S. PATENT DOCUMENTS

| | | | |
|---|---|---|---|
| 5,105,421 A | 4/1992 | Gingell | |
| 5,590,124 A | 12/1996 | Robins | |
| 5,930,496 A | 7/1999 | MacLaren et al. | |
| 6,012,143 A | 1/2000 | Tanaka | |
| 6,081,850 A | 6/2000 | Garney | |
| 6,269,099 B1 | 7/2001 | Borella et al. | |
| 6,269,416 B1 | 7/2001 | Meier et al. | |
| 6,373,837 B1 | 4/2002 | Kleyman | |
| 6,512,768 B1 | 1/2003 | Thomas | |
| 6,528,904 B1 | 3/2003 | Wong | |
| 6,715,019 B1 | 3/2004 | Benson et al. | |
| 7,002,961 B1 * | 2/2006 | Lane et al. | 370/395.1 |
| 7,103,761 B2 * | 9/2006 | Larson et al. | 713/1 |
| 7,188,205 B2 | 3/2007 | Le et al. | |
| 7,716,386 B1 * | 5/2010 | Vssquez et al. | 710/19 |
| 2003/0033464 A1 | 2/2003 | Larson et al. | |
| 2003/0058856 A1 * | 3/2003 | Salett et al. | 370/389 |
| 2003/0163555 A1 * | 8/2003 | Battou et al. | 709/223 |
| 2004/0117438 A1 * | 6/2004 | Considine et al. | 709/203 |
| 2005/0174950 A1 * | 8/2005 | Ayyagari | 370/254 |

OTHER PUBLICATIONS

SFTOS Configuration Guide, May 2005, Force 10.*
Jeff Covey, Client As Server: The New Model, Apr. 16, 2000 p. 1.*
McCloghrie K, et al., "Entity MIB," IETF Network Working Group Request for Comments No. 2737, Dec. 1999.
Alex Vasquez, LVL7 Systems, "Crafting Distributed Software for Stackable Switches", Comms Design (Jul. 29, 2004) 5 pgs.

* cited by examiner

*Primary Examiner*—Henry W Tsai
*Assistant Examiner*—Hyun Nam (57) ABSTRACT

Embodiments of this invention comprise a modular, scalable architecture for building a variety of Layer 2/3/4+ Ethernet products and devices. Such devices or units can be attached to form an homogenous systems called stack. The invention provides a set of rules to handle such stack. The rules are controlled by the architectural component named Unit Manager. The Unit Manager uses a protocol to discover the units that are entering or leaving the system/stack. The protocol's data provides a unique way of identifying the units that belong to the system stack.

11 Claims, 10 Drawing Sheets

| 903 | 905 | 908 | 909 | 911 | 913 | 915 | 918 | 921 | 923 | 925 | 928 | 931 | 933 | 935 |
|---|---|---|---|---|---|---|---|---|---|---|---|---|---|---|
| UNIT ID | UNIT TYPE | TYPE IDX | MU | AMP | HMP | MID | UD | CD | DCVF | DCVR | UMAC | CUN | IC | MM |

Fig. 9
Discovery Message

COMPONENT IDENTIFICATION AND TRANSMISSION SYSTEM

CROSS REFERENCE TO RELATED APPLICATIONS

This application claims priority to a U.S. Provisional Patent Application with application No. 60/619,173 entitled "COMPONENT IDENTIFICATION AND TRANSMISSION SYSTEM", filed on Oct. 15, 2004, which is hereby incorporated by reference in its entirety.

BACKGROUND OF THE INVENTION

Embodiments of the invention comprise a component identification system which provides an architecture for connecting various electronic units, and managing and controlling the units and the system of which they are a part. Such devices or units may be attached to form a homogenous system called a stack. Embodiments of the invention provide a set of rules to handle such stack. The rules are controlled by the architectural component named Unit Manager. The Unit Manager uses a protocol to discover the units that are entering or leaving the system/stack. The protocol's data provides a unique way of identifying the units that belong to the system/stack. Description of embodiments of a component identification system can also be found in co-pending U.S. patent application Ser. No. 11/252,202, entitled "Component Identification and Management Unit," by Vasquez et al. filed on Oct. 17, 2005, and incorporated herein by reference. Related methods of operation and computer readable media are also provided. Other systems and methods of the invention will be or become apparent to one skilled in the art upon examination of the following figures and detailed description. It is intended that all such additional systems, methods, features, and advantages be included with this description, be with the scope of the invention, and be protected by the accompanying claims.

BRIEF DESCRIPTION OF THE DRAWINGS

Reference may be made to the following figures. The components within the figures are not necessarily to scale, emphasis instead being placed upon illustrating the principles involved. Moreover, in the figures, like reference numerals designate corresponding parts or blocks throughout the different views.

While there may be various modifications and alternative forms, specific embodiments have been shown by way of example in the drawings and subsequently are described in detail and should be understood not to be limiting to the particular forms disclosed, rather covering all modifications, equivalents, and alternatives falling within the spirit and scope of the embodiments and description.

DETAILED DESCRIPTION OF EMBODIMENTS

As used in the specification and the appended claims, the singular forms "a," "an" and "the" include plural referents unless the contest clearly indicates otherwise. Similarly, "optional" or "optionally" means that the subsequently described event or circumstance may or may not occur, and that the description includes instances where the even or circumstance occurs and instances where it does not.

Figure 1:
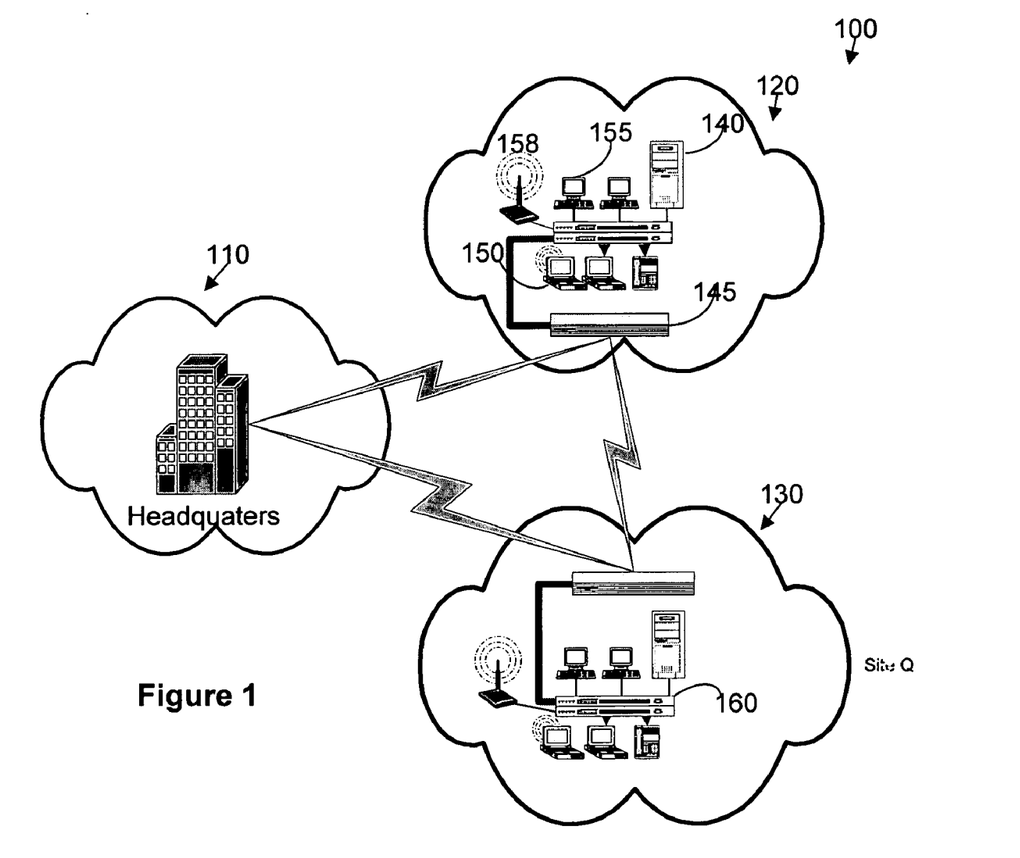
FIG. 1 is an illustrative environmental drawing for a component identification system according to the present invention.

FIG. 1 is an illustrative environmental drawing for a component identification system 100 according to the example embodiment. The system 100 includes a headquarters site 110, a remote site 120, and a remote site 130. Each site includes numerous electronic devices, such as a local server 140, telephone 145, laptops 150, networked stations 155, and wireless access point 158. A component identifier 160 connects these electronic devices and transmits messages among them. This component identifier 160 is described in greater detail with reference to subsequent figures. One skilled in the art will appreciate that the headquarters site 110 can include at least one component identifier 160 and a plurality of associated components, though not shown. In other example embodiments, the system 100 may include as few as one site or more than three sites.

Figure 2A:
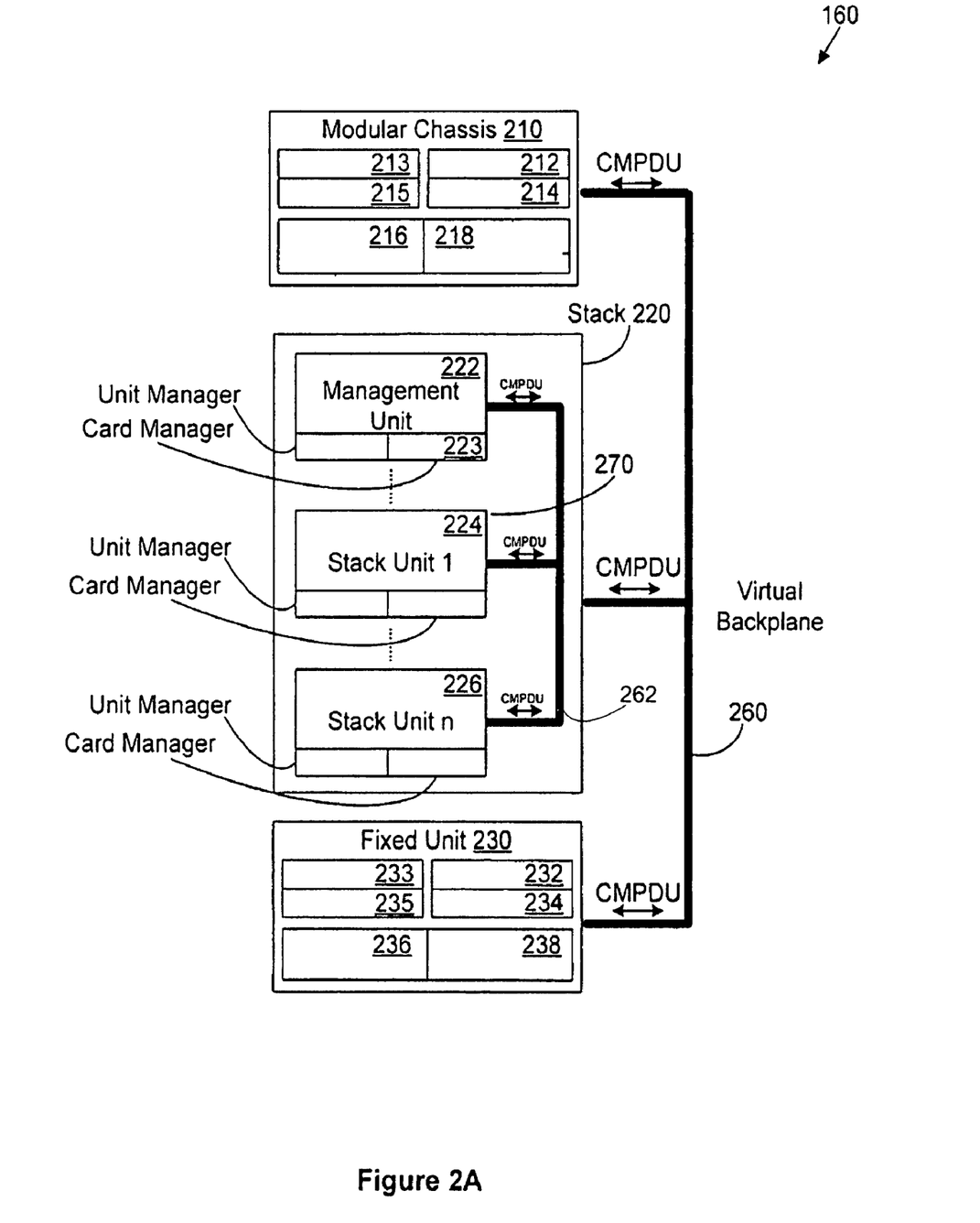
FIG. 2A is an enlarged block diagram of the component identifier of FIG. 1.

FIG. 2A is an enlarged block diagram of a component identifier 160. The component identifier 160 may include a modular chassis 210, stack 220, and a fixed unit 230. A modular chassis may be an entity that is composed of modules which can be replaced and a fixed unit is an entity which modules can not be replaced. A stack may include a collection of fixed units or modular chassis connected by a virtual backplane. In an alternative embodiment, the component identifier 160 may include several modular chassis, fixed units, or some combination thereof. By varying the number and types of items (e.g., fixed units, modular chassis, and/or stacks) within the component identifier 160, the number of electronic devices (e.g., telephones 145, laptops 150) within the component identification system 100 may be increased.

A virtual backplane 260 can connect individual items, or units, within the component identifier 160. For example, the primary virtual backplane (VBP) 260 connects the modular chassis 210, stack 220, and the fixed unit 230. The virtual backplane 260 may connect a host of modular chassis, stacks, or fixed units. One type of virtual backplane that may be used may include a 10 Gigabit Ethernet cable. Other types of virtual backplanes that may be used may include wired bus, fiber optic cables, or any media that can transmit control information. If at some initial time there is only one item connected such as stack 220, the primary virtual backplane 260 may remain essentially non-operational. However, adding an additional item, such as modular chassis 210 or fixed unit 230, activates the virtual backplane 260, to connect them as a stack. This addition results in the modular chassis 210, stack 220, or fixed unit 230 being designated as the primary manager. In other words, one unit is designated as the primary Management Unit when the primary virtual backplane 260 is activated. The primary Management Unit can control the transfer of information among the modular chassis 210, stack 220, or fixed unit 230. When joined by a virtual backplane 260, the modular chassis 210, stack 220, and fixed unit 230 may form a larger stack, which may be referred to as the primary stack 160 (interchangeable with "component identifier"), whereas the smaller group of units 222, 224, and 226 connected by virtual backplane 262 may be referred to as the secondary stack 220.

Each fixed unit or modular chassis can include cards. Both the modular chassis 210 and the fixed unit 230 can include slots, which can hold cards. For example, modular chassis 210 includes a modular chassis 210 with cards 212-215. These cards can connect the components described with reference to FIG. 1. For example, card 213 can connect the telephone 145, while card 215 connects the laptop computer 150. The card 212 can connect the local server 140, while card 214 connects the networked stations 155. Similar to the modular chassis 210, the fixed unit 230 includes cards 232-235, which can connect the components shown in FIG. 1. Though the modular chassis 210 and the fixed unit 230 include four cards, the number of cards may vary. For example, there may be as few as twelve cards or as many as twenty cards.

The modular chassis 210 and the fixed unit 230 can include both a Card Manager and a Unit Manager. For example, the modular chassis 210 may include a Unit Manager 216 and a Card Manager 218. If the modular chassis 210 is designated as the Management Unit for the primary stack 260, it can manage the modular chassis 210, the secondary stack 220, and the fixed unit 230. In other words, the Unit Manager 216 notes when a unit is connected or disconnected from the stack, or component identifier 160. In contrast, the Card Manager 218 manages both the slots and cards for the modular chassis 210 and the fixed unit 230. In other words, the Card Manager 218 of the Management Unit notes when a card is inserted or removed from a slot within the modular chassis 210 and the fixed unit 230.

It is important to note the distinction between a Unit Manager and a Management Unit (described in more detail below). While each unit in a stack may have its own Unit Manager component (e.g., Unit Manager 216), which manages operation of that particular unit, the stack may also have one unit called the Management Unit (e.g., modular chassis 210). The Management Unit may coordinate operation of other units in the stack, such as the secondary stack 220 and fixed unit 230.

A secondary stack can include several fixed units or modular chassis connected by a secondary backplane 262. For example, the secondary stack 220 can include a local, secondary Management Unit 222, which controls the transfer of information among the items within secondary stack 220. The secondary Management Unit 222 can control the transfer of information among the stack unit 224 and the stack unit 226. These stack units can be either a modular chassis or a fixed unit, for example. However, a stack can only have one designated Management Unit, which controls the networking ports of the other non-Management Units (NMU). In the arrangement shown in FIG. 2A, Management Unit 222 controls non-Management Units 224 and 226.

As described with reference to the modular chassis 210 and the fixed unit 230, the secondary stack units 224 and 226 may include individual cards and slots. The Card Manager 223 within the secondary Management Unit 222 notes when cards are inserted or removed from slots within the stack units 224 and 226.

Figure 2B:
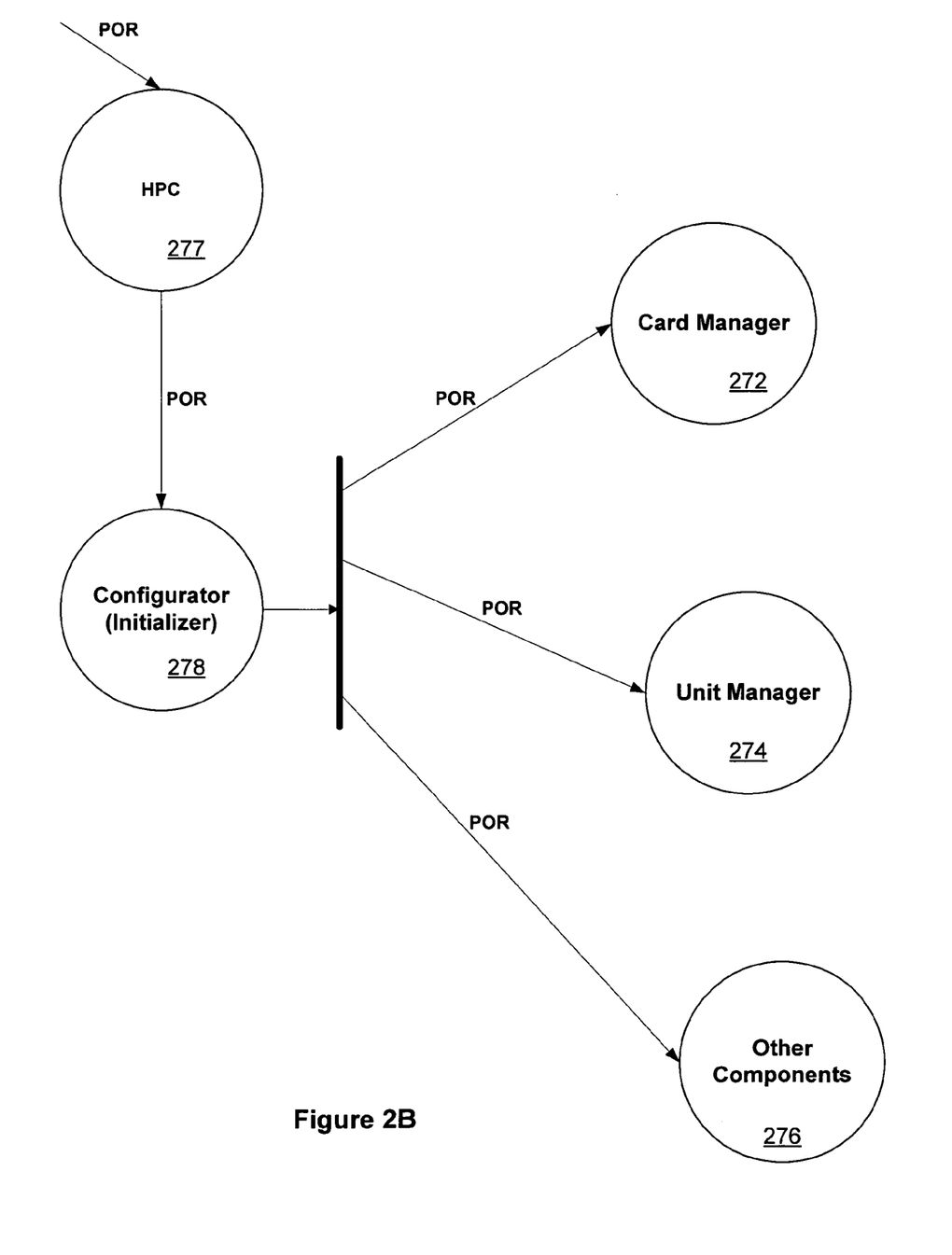
FIG. 2B is a block diagram illustrating running processes for units within the component identifier of FIG. 2A.

FIG. 2B is a block diagram for any unit 270 within the stack 220 or component identifier 160. FIG. 2B illustrates the running processes for any unit 270 whether it is a fixed unit or modular chassis, according to an example embodiment. The Card Manager 272 and the Unit Manager 274 of FIG. 2B can be any one of the Card Managers or Unit Managers described with the reference to FIG. 2A. As illustrated in FIG. 2B, the Card Manager 272 and Unit Manager 274 are two components within the unit 270. Together, the components within the unit 270 enable the establishment of a virtual backplane (VBP), such as VBP 260 or VBP 262. Receiving a power on reset (POR) signal powers the unit 270. This signal is generally associated with either powering on the unit 270 or resetting the unit 270. The signal is received by the hardware platform control, or HPC, 277. The primary responsibility of a HPC, as it relates to the component identification system 100, is establishing the virtual backplane 260 described with reference to FIG. 2A. The HPC 277 forwards the POR signal to the Initializer 278, which is a process responsible for configuring and initializing the system's processes. The Initializer 278 determines which system process is to be initialized next based on the POR signal. The Initializer 278 then forwards the POR signal to the Card Manager 272 and Unit Manager 274. When these entities receive the POR signal, each begins a unit initialization process, which is described with reference to subsequent flowcharts. The unit 270 can also include other components 276, such as unit applications. The POR signal may also prompt an initialization process for these other components 276.

Figure 3:
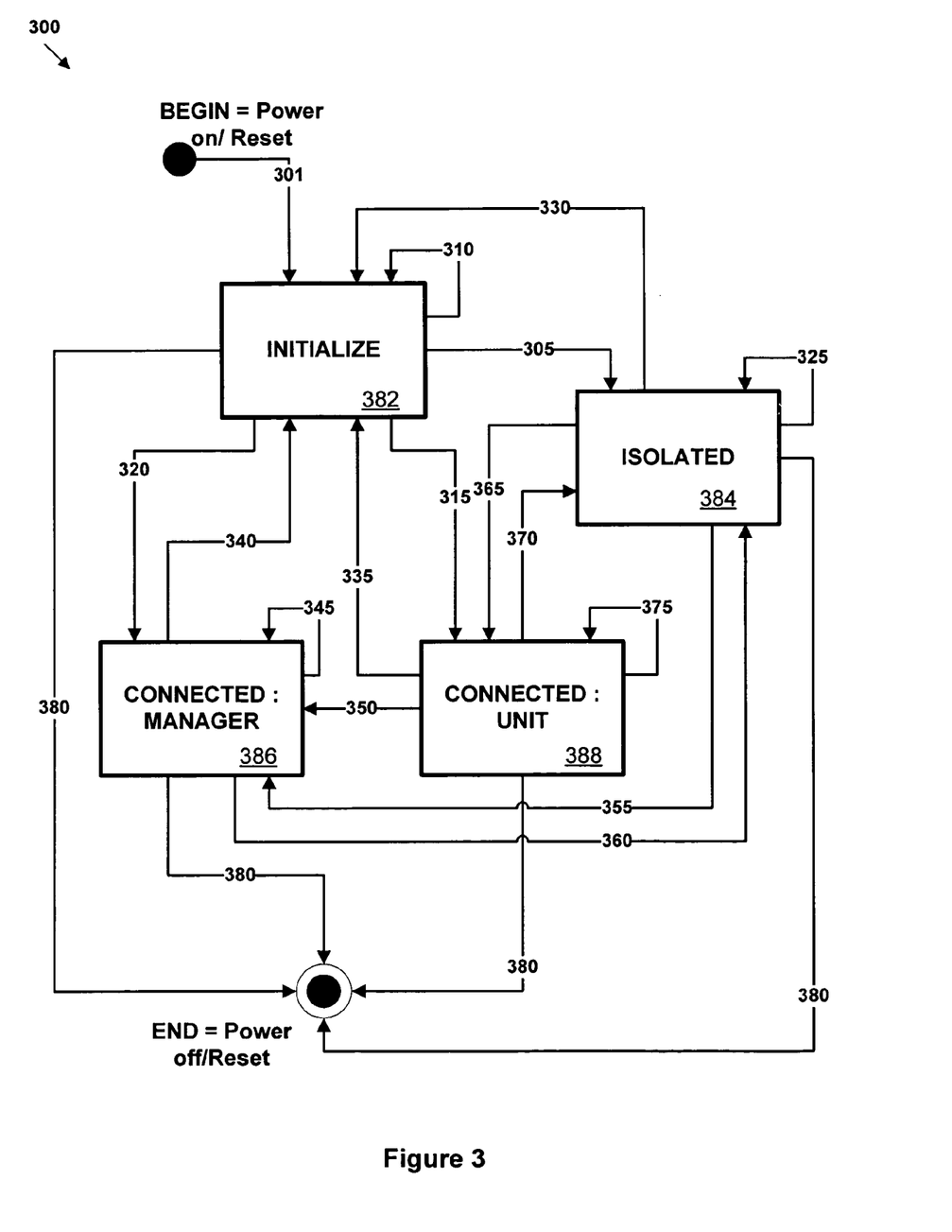
FIG. 3 is a block diagram illustrating the transitions interrelating four states of operation of the Unit Manager of FIG. 2B.

The Unit Manager 274 described with reference to FIG. 2B is a state machine. As one of ordinary skill in the art can appreciate, a state machine has an associated state diagram with corresponding transitions, which are described with reference to FIG. 3. Actions taken by the state machine are illustrated by the flowcharts in FIGS. 4-9. As illustrated in FIG. 3, the Unit Manager 274 transitions among four states labeled Initialize 382, Isolated 384, Connected:Manager 386, and Connected:Unit 388. These states were described generally above but are described in more detail with reference to FIGS. 4-9 below.

Figure 9:
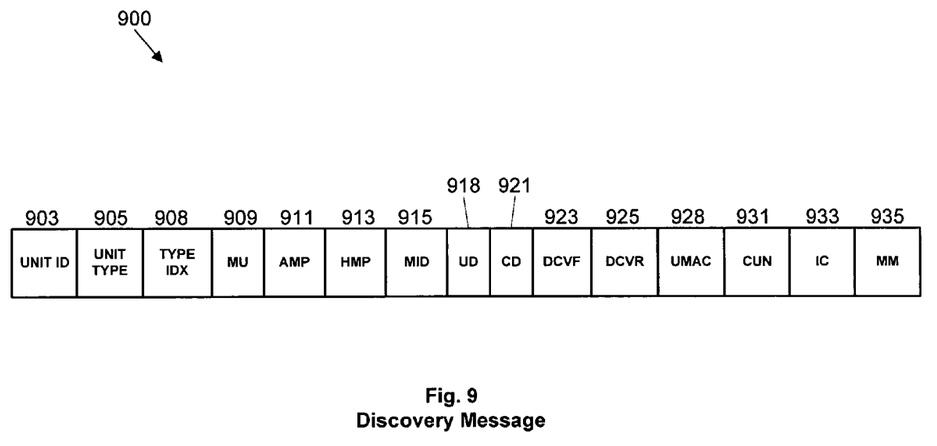
FIG. 9 is a block diagram illustrating the contents of a discovery message.

These four states include Initialize 382, Isolated 384, Connected:Manager 386, and Connected:Unit 388. The Unit Manager (e.g., Unit Manager 216, FIG. 2B) acts as a state machine, transitioning the operation of the unit 270 between the four states, as further described below. The software program FASTPATH can be used to run a Unit Manager, to disseminate information in Unit Manager protocol (UMP, also called "unit discovery protocol") to remote applications. UMP is used to form a stack and to execute the Initialize, Isolated, Connected:Unit, and Connected:Manager subroutines. Discovery messages, described in more detail with reference to FIG. 9, are sent by UMP in the form of Unit Manager protocol data units (UMPDU). In relation to the Unit Manager, UMPDU functions similarly to the Card Manager data units associated with Card Manager 272 of FIG. 2B.

Returning to FIG. 3, the state Initialize 382 can be described in greater detail. As a unit is powered on or reset, there is a transition 301 to the Initialize state 382, which is described in greater detail with reference to FIG. 4. The Initialize state 382 involves a periodic polling process associated with sending a discovery message to other units, or hardware components and awaiting a return message.

In the transition 310, the operational flow loops back into the Initialize state 382. This occurs when any one of the following conditions occurs: a start message reception begins; or a Unit Identification Number or unit number. A start message reception is an event indicating that message reception has been initialized. A Unit Identification Number cannot be assigned when the unit does not support stacking or the unit is not working properly.

The transition 380 goes from the Initialize state 382 to an end state. The transition 380 occurs when there is a software reset or alternatively a power-off reset. A software reset can occur when a fault or anomaly occurs in the system. An example of such anomaly is division by zero.

Transitions can also occur from the Initialize state 382 to a connected state. For example, the transitions 315 from the Initialize state 382 to the Connected:Unit state 388 may occur when it is determined that unit 270 is not a Management Unit. If however the unit 270 is a Management Unit, then by transition 320, the Connected:Manager state 386 is entered. The subroutine associated with operation in the Connected:Unit state 388 is described in FIG. 7, and the Isolated state 384 is described in more detail below with reference to FIG. 6.

In the event that a designated Unit Manager (e.g., Unit Manager 216) does not exist, the unit 270 stops receiving messages and transitions into the Isolated state 384, via the transition 305. The unit 270 can exit the Isolated state 384 via the transition 380 upon software reset or power-off reset. Subroutines associated with operation in the Isolated state 384 are described in more detail below with reference to FIG. 6. In the Isolated state 384, the unit 270 periodically sends discovery messages and may receive messages from other units (e.g., messages assigning the unit 270 as the Management Unit). The advance network device layer (ANDL) protocol controls the networking ports. When the unit 270 is in this state, the unit does not forward any traffic on its ports.

From the Isolated state 384, the operational flow loops back to the Isolated state 384 with the transition 325. The transition 325 occurs when the unit receives a discovery message from another unit, a discovery message from another unit with/without a conflict-stay, or a discovery message from another unit with conflict-yield. Conflict-stay means that the unit has the resources and qualification to be the Management Unit. The conflict-yield is when the unit has found that there are other units with better qualification to become a Management Unit. Examples of such qualification are: enough resources or administratively. In addition, the transition 325 occurs when a discovery message is sent; receive timers are checked, a log message is sent; or, if an event log is sent.

There can be transitions from the Isolated state 384 to the Initialize state 382, Connected:Manager state 386, and the Connected:Unit state 388. If a Unit ID cannot be assigned, the unit 270 exits the Isolated state 384 and enter the Initialize state 382, via the transition 330. The transition 355 to the Connected:Manager state 386 occurs after either a first designated time period, T.ipl, or a second designated time period, T.transfer. These time periods are described in greater detail with reference to FIG. 6. The transition 365 to the Connected: Unit state 388 occurs where a discovery message has been received from a Management Unit.

In the Connected:Unit state 388, described in more detail below with reference to FIG. 7, the unit 270 has connectivity to a stack and is communicating with a Management Unit. From the Connected:Unit state 388, several exit transitions may occur. When a third designated time period, T.rx, occurs, there is a transition 370, which leads to the Isolated state 384. The time period T.rx refers to the maximum amount of time to wait to receive the unit discovery message. If the message is not received within time period T.rx, the unit 270 is considered to be non-functional. The time period T.rx can be a multiple of a fourth period, T.tx. The time period T.tx is a time period utilized in sending the discovery message. According to an example embodiment, T.rx may be 2 seconds, 3 seconds, 5 seconds or some other suitable time period. Then for example, T.tx may be 2 seconds, 6 seconds, 25 seconds or some other suitable multiple of T.rx.

Like the Isolated state 384, there can be numerous transitions from the Connected:Unit state 388. In one instance, there is a transition 335 from the Connected:Unit state 388 back to the Initialize state 382. The transition 325 may occur when either a discovery message with conflict-yield is received from the Management Unit, or if a Unit ID cannot be assigned. The transition 375, loops the operational flow of the subroutine back to the Connected:Unit state 388 when one of the following conditions occurs: a discovery message with conflict-stay is received from the Management Unit; a discovery message from another unit is received, with conflict-stay or conflict-yield; a discovery message is sent; the time period T.rx is passed; received timers are checked; the this administrative mode is disabled; a log message is sent; a log event is sent; a Unit ID is reassigned; or, a trap is received. An administrative mode is an indication of the network administrator indicating that this unit can (enable) or can not (disable) become the Management Unit. When the administrative mode is enabled, the transition 350 occurs from the unit from the Connected:Unit state 388 to Connected:Manager state 386. The transition 380 from the Connected:Unit state 388 corresponds to a software reset or power-off reset.

Figure 8:
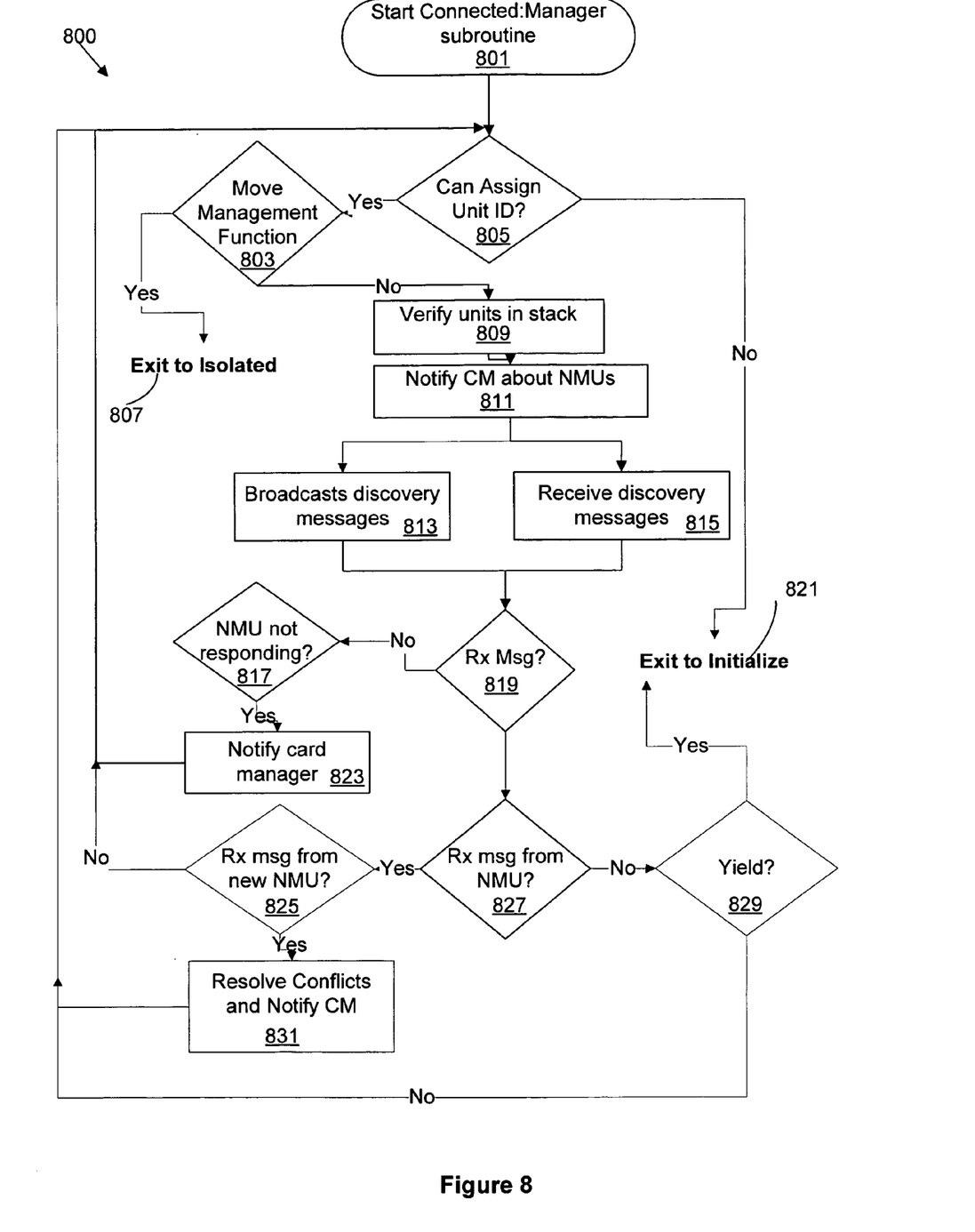
FIG. 8 is a flowchart of a subroutine associated with operation of a unit in the Connected:Manager state.

In the Connected:Manager state 386, described in more detail by FIG. 8, the unit 270 performs the Management Unit function for the stack. Four transitions lead out of the Connected:Manager state 386. Transition 340 leads back to the Initialize state 382 and occurs where a discovery message with conflict-yield or conflict-stay is received from the Management Unit, or where a Unit ID cannot be assigned. Transition 345, which loops the unit operation back into Connected:Manager state 386, occurs where: a discover message with a conflict-stay is received from a Management Unit or non-Management Unit; a discovery message is sent; the time period T.rx is passed; the unit is a non-Management Unit; receive timers are checked; the proceed to normal operation command applies; administrative mode is enabled; a log message or event log is sent; the Unit ID is reassigned; or a trap is received. The proceed to normal operation command is an indication that the unit is a Management Unit and the unit can control the system. The transition 360 from the Connected:Manager state 386 into the Isolated state 384, corresponds to either the move management function or an administrative mode disable. The move management function is indication that the Management Unit shall be moved to another unit. The administrative mode disable is indication that the unit can not become the Management Unit. The transition 380, corresponding to a software reset or power-off reset, also exits the unit out of the Connected:Manager state 386.

Description of the System's Processes

Figure 4:
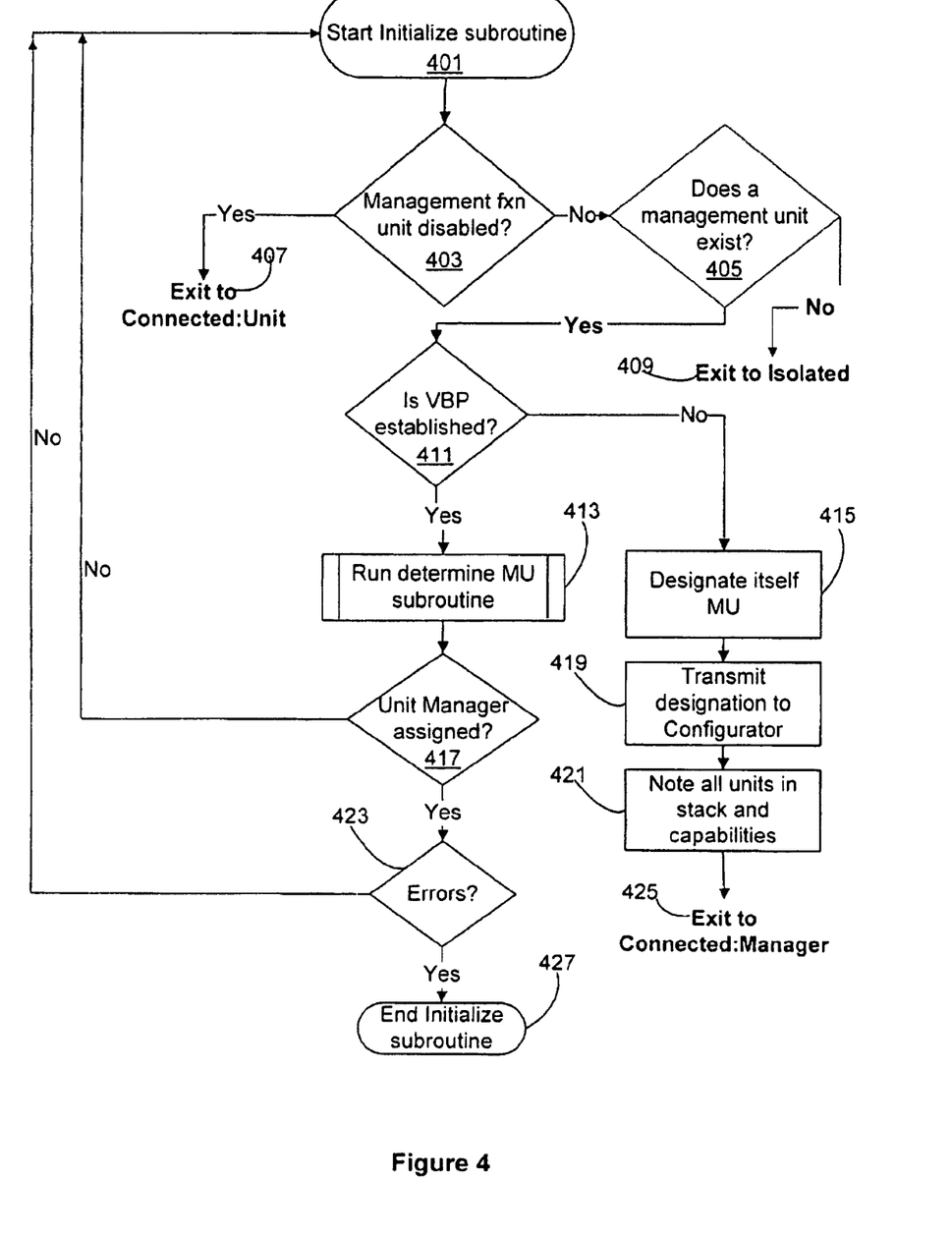
FIG. 4 is a flowchart of a subroutine associated with operation of a unit in the Initialize state.

Turning now to FIGS. 4-9, these flowcharts describe the operation of a unit 270 within the component identifier 160. FIG. 4 is a flowchart illustrating the operation of a unit initialization subroutine that begins at block 401. The initialization subroutine describes operations that occur when the unit 270 is in the Initialize state 382 described with reference to FIG. 3. Any process descriptions or blocks in the flowcharts can be understood as representing modules, segments, or portions of code, which may include one or more executable instructions for implementing specific logical functions or blocks in the process. Alternative implementations are included with the scope of the invention in which functions may be executed out of order from that shown or discussed, including substantially concurrently or in reverse order, depending on the functionality involved, as can be understood by those reasonably skilled in the art.

In block 403, a check is performed to determine if the Management Unit function is disabled on that unit. The Management Unit function is responsible for the normal operation of the stack. Normal operation includes network protocol packet handling, network this administrator configuration and management of the stack. To perform this check, the value of a particular indicator, such as a flag, can be assessed. When the Management Unit function is disabled, operation moves along the "yes" path to the block 407, where the unit leaves the Initialize state and enters the Connected:Unit state 388.

If the Management Unit function has not been disabled, the operation progresses along the "no" path to block 405, which determines whether a Management Unit exists. If at block 405 it is determined that a Management Unit does not exist, operational flow of the subroutine continues along the "no" path to block 409, where the unit exits the Initialize state 382 and enters the Isolated state 384. If at block 405 it is determined that a Management Unit does exist, the flow moves along the "yes" path to block 411.

Block 411 determines whether a virtual backplane (VBP) has been established. It may take some time for the HPC 276 (see FIG. 2B) and the ANDL to verify the stacking connection, which is controlled by the VBP. During this time the Unit Manager 274 waits in the Initialize state 382 until the stacking interface is ready. Once the HPC 277 reports that stacking is ready, the Unit Manager 274 registers a callback with the HPC 277 to receive messages and then starts collecting messages for T.rx seconds. After T.rx seconds, the Unit Manager 274 has a list of all units in the stack and their capabilities.

Figure 5:
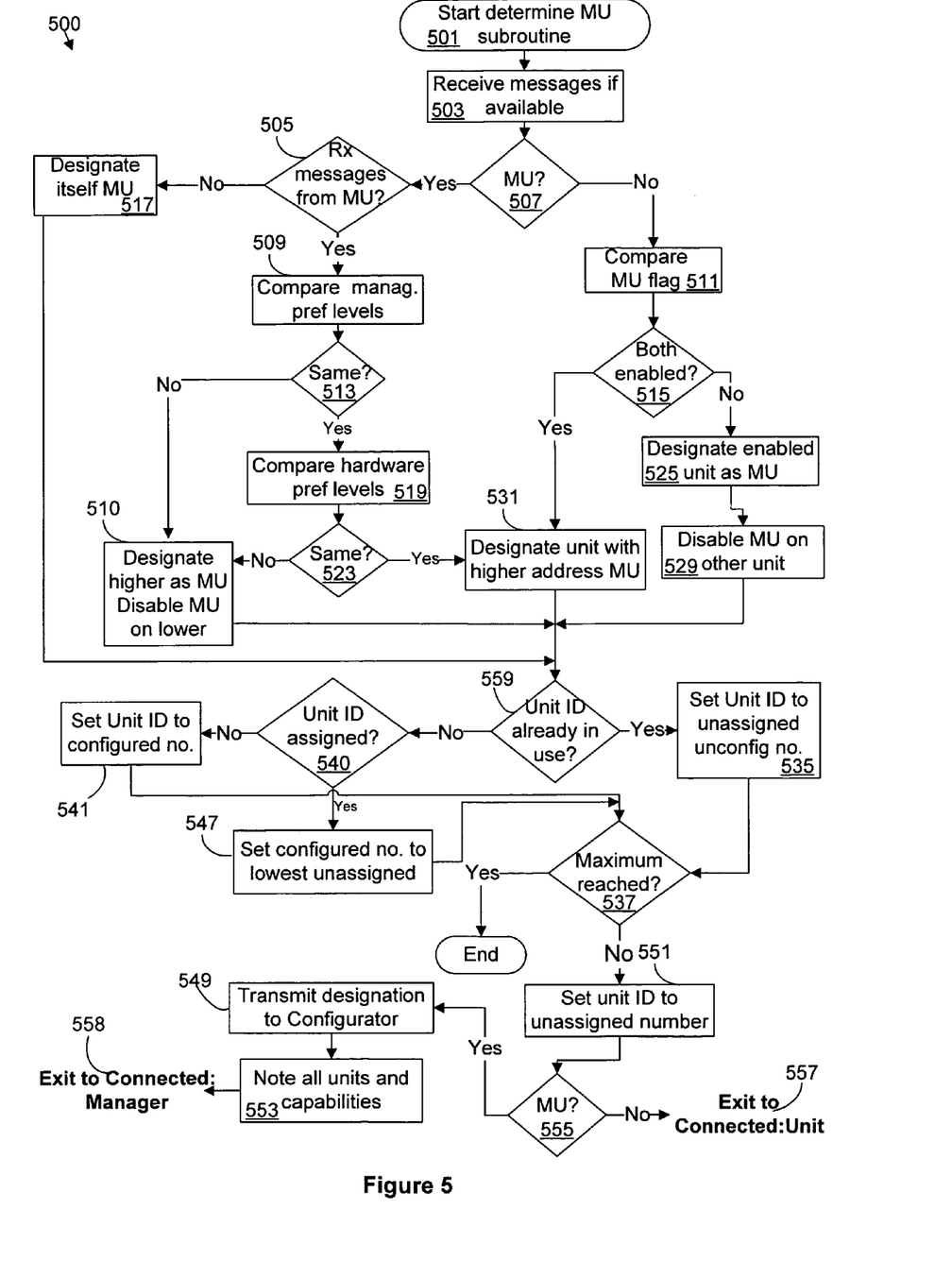
FIG. 5 is a flowchart of a subroutine for resolving unit number and Management Unit conflicts.

If a VBP has been established, a subroutine that determines a Management Unit is run at block 413. FIG. 5, which is subsequently described, is a flowchart illustrating the details of this subroutine. Briefly, this subroutine resolves conflicts when a unit is configured to be a Management Unit and there is another Management Unit already active. This conflict is resolved by disabling the management function of the recently configured unit when there is an active Management Unit or by enabling the management function when there is not an active Management Unit.

If at block 411 a VBP has not been established, the unit 270 designates itself as the Management Unit at block 415. In block 419, a notice of this designation is transmitted to the Configurator 278 from the HPC 277 at block 419. All the units in the stack and their associated capabilities are noted at block 421. After block 421, there is an exit from the Initialize state 382 to the Connected:Manager state 384, at 425.

Continuing from block 413, it is determined whether a Unit Manager has been assigned, at block 417. If a Unit Manager has not been assigned, the unit initialization subroutine repeats. Otherwise, an error check is performed at block 423. If errors have occurred ("yes"), the Initialize subroutine ends, at block 427. If errors have not occurred ("no"), operation returns to block 401.

FIG. 5 is a flowchart 500 depicting the Determine Management Unit (Determine MU), subroutine from block 413 initially described with reference to FIG. 4. The Determine MU subroutine 413 is used to resolve unit number conflicts and Management Unit status conflicts in an effort to determine which unit becomes the Management Unit. This subroutine begins at block 501 and proceeds to block 503, where any messages transmitted by other units are received. These messages can be the discovery messages described herein.

At block 507, the unit receiving the message checks to see if it is a Management Unit (MU). If the receiving unit is a MU the subroutine proceeds along the "yes" path to block 505. At block 505, the subroutine determines if the received message is from a MU (that is a MU in the stack other than the MU receiving the message). If at block 505 a message has not been received from another Management Unit, the "no" path is followed and at block 517, the receiving unit 270 designates itself as the Management Unit for the stack and the subroutine progresses to block 559, which is subsequently described.

If at block 505, it is determined that the message is from a MU, the subroutine continues to block 509 where the management preference levels of the receiving unit 270 and the unit sending the message are compared. A management-assigned preference level can be assigned based upon decision from the network administrator to make this unit the management unit of the stack. These preference levels are stored as Management Unit flags. Following the preference level comparison performed at block 509, the subroutine determines at block 513 if both units have the same management-assigned preference level. If so, the "yes" path is followed and the tie is broken through comparing the hardware preference levels of the two units, at block 519. The hardware preference levels can be stored using a flag or can be set via hardware such as configuring a jumper on a set of pins. If the hardware preference levels are the same, the unit with higher preset address is designated as the Management Unit at block 531 and then the subroutine proceeds to block 559. This preset address may include the Media Access Control, or MAC, address. Other addresses such as IP or system unique signature may also be used as long as the address value is unique.

If the hardware preference levels are not the same, then the unit with the higher level is designated as the MU at block 510 and the unit with the lower level has its MU function disabled. The subroutine then proceeds to block 559 which is described subsequently.

If it is determined at block 507 that unit 270, the receiving unit, it is not an active Management Unit then the Management Unit (MU) flags are compared at block 511. The comparison made in this block can occur in certain instances because of the completion of block 510 at some earlier time wherein the Management Unit flags that are compared at block 511 are the Management Unit flags that are set in blocks 510.

After the Management Unit flag comparison performed at 511, the subroutine determines at block 515 if both units in consideration have their Management Unit flags enabled. If "yes", e.g., both have their flags enabled, at block 531 the unit having the higher pre-set address (normally the addresses compared are MAC addressed) is designated as the Management Unit as previously described. If at block 515 only one unit has its MU flag enabled then the "no" path is followed to block 525, where the unit having an enabled MU flag is designated as the Management Unit and the Management Unit function of the non-flag-enabled unit is disabled at block 529. If neither unit has the MU flag set, neither unit will become the Management Unit for a stack system.

Block 559 follows block 517, 510, 529, and 531. At block 559, it is determined if the Unit ID designated to the assigned Management Unit is already in use by another unit in the stack. The unit identification number (Unit ID) is a unique value that identifies a unit in a stack, which may be pre-set in non-volatile memory or may initially be unassigned. Every unit in the stack holds a unique Unit ID value, and in the case that two units have the same Unit ID number, one must change its configured Unit ID to the lowest unassigned unit number available. If the unit number has been set and there are no other devices using the same unit number, that unit proceeds with the set unit number.

When it is determined that the Unit ID is already in use, block 535 follows block 559. In block 535, the Unit ID for one of the two units. The unit that sent the message is designated as an unassigned, unconfigured number. Block 535 is followed by block 537, which is subsequently described.

When it is determined that the Unit ID is not already in use in block 559, then it is determined at block 540 whether the Unit ID is already assigned. This may be assessed by the Unit Manager. If it is determined that the Unit ID is not assigned at block 540, then the Unit ID may be set to a pre-configured value at block 541. Otherwise, the configured number is set to the lowest unassigned number at block 547 and the subroutine proceeds to block 537.

Block 537 follows block 535, 541, and 547. At block 537, the subroutine determines if the stack has reached the maximum capacity of units. The maximum capacity of units for a stack depends upon the system's engineering settings, the particular hardware technology involved, and the extent of the resources of that that unit in terms of its ability to control other units in the stack. However, a stack can have a maximum capacity of 3 units, 7 units, 10 units or some other suitable number. If the maximum capacity is reached, then the determine Management Unit subroutine ends. Otherwise, the "no" path is followed to block 551, where the Unit ID is set to an unassigned number. The subroutine then proceeds to block 555.

The subroutine performs a Management Unit determination at block 555. If the unit is not a Management Unit, there is an exit of the Determine MU subroutine and the Connected:Unit state 388 is entered at block 557. If the unit is determined to be a Management Unit, designation of this status is transmitted to the Configurator 278 at block 549. All the units in the stack and their capabilities are noted at block 553. Noting these capabilities can include active stack unit, units can become Management Unit in the case the current Management Unit can no longer continue controlling the domain-network forwarder. Subsequently, the unit exits the Determine MU subroutine and enters the Connected:Manager state at 558.

Figure 6:
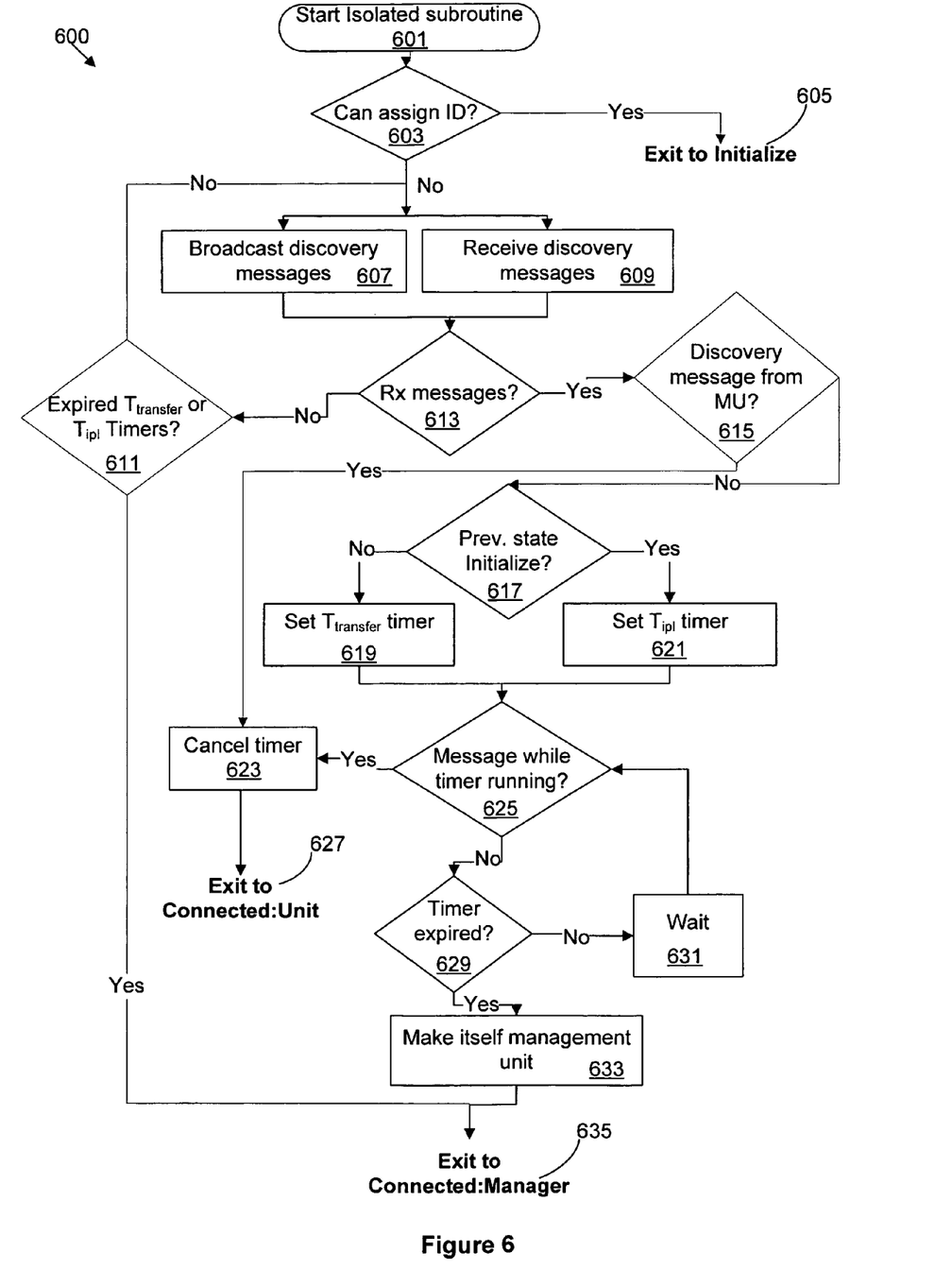
FIG. 6 is a flowchart of a subroutine associated with operation of a unit in the Isolated state.

Turning now to FIG. 6, this figure illustrates a flowchart 600 associated with operation of a unit in the Isolated state 384. In the Isolated state 384, the unit 270 periodically sends discovery messages and may receive messages from other units (e.g., messages assigning the unit 270 as the Management Unit), but it does not forward any traffic on its network ports.

The Isolated subroutine 600 begins at block 601. Next, at block 603 it determines if a unique Unit ID can be assigned to the unit 270. If one can be assigned, it leaves the Isolated state 384 and begins initializing, by entering the Initialize state 382 at 605. If a unique Unit ID cannot be assigned, however, the subroutine proceeds to blocks 607, 609, and 611. Here, the unit 270 attempts to communicate with other units in the stack, periodically sending discovery messages every $T_{tx}$ seconds and attempting to receive messages sent by other units. If the unit 270 does not receive a discovery message after waiting $T_{rx}$ seconds, the unit 270 is considered to be non-functional (disabled), not connected to the stack.

If a unit receives a message from the existing Management Unit while the T.ipl or T.transfer timers are running, this may indicate that it does have a connection with the stack, so the timers are cancelled and the unit then transitions into the Connected:Unit state 388. This is shown by the "yes" path following block 613: the subroutine determines at block 615 if the message originated from the Management Unit, and if it did, timers are canceled at block 623 and the unit leaves the Isolated state 384 to enter the Connected:Unit state 388 at block 627. However, if no messages have been received at block 613, the subroutine checks to see if timers are still running, at block 611. If at block 615 the message did not originate from the Management Unit, e.g., originated in a non-Management Unit, the subroutine proceeds down the "no" path to block 617.

At block 617, if the unit 270 was previously in the Initialize state before it entered the Isolated state 384, it sets the T.ipl timer at block 621 and then proceeds to block 625. If the Isolated state 384 was entered from another state, it sets the T.transfer timer at block 619 and proceeds to block 625.

At block 611, where no messages have been received, the Isolated subroutine 600 determines if the T.transfer or T.ipl timers have expired. T.transfer refers to the amount of time a non-Management Unit waits before attempting to become recognized as a management unit; the recommended setting is T.transfer=T.rx*2=20 seconds. Once a non-Management Unit detects that the Management Unit is absent, this wait begins. T.ipl is the amount of time it waits, after power-up, to be recognized as a Management Unit. Although the recommended setting depends on the anticipated boot time of the devices, the initial recommended setting is T.ipl=5 minutes. If timers have expired, e.g., the wait is over, the "yes" path is followed to 635, where the unit 270 leaves the Isolated state 384 and enters the Connected:Manager state 386, becoming the Management Unit for the stack. However, if timers have not expired, the unit will continue to wait to receive messages, remaining in the Isolated state; In this case, the subroutine returns to blocks 607 and 609.

At block 625, if the message was received while timers were running, the unit 270 therefore is connected to the stack and can enter the Connected:Unit state 388 at 627, after first canceling timers at block 623. If at block 625 timers were not running when the unit 270 received the message, the subroutine proceeds down the "no" path and determines at block 629 if the timers have expired. If timers have expired, the unit 270 makes itself the Management Unit for the stack, at block 633, by leaving the Isolated state 384 and entering Connected:Manager state at 635. If at block 629 timers had not expired, however, the unit 270 stays in a wait period at block 631 and then returns to block 625.

Figure 7:
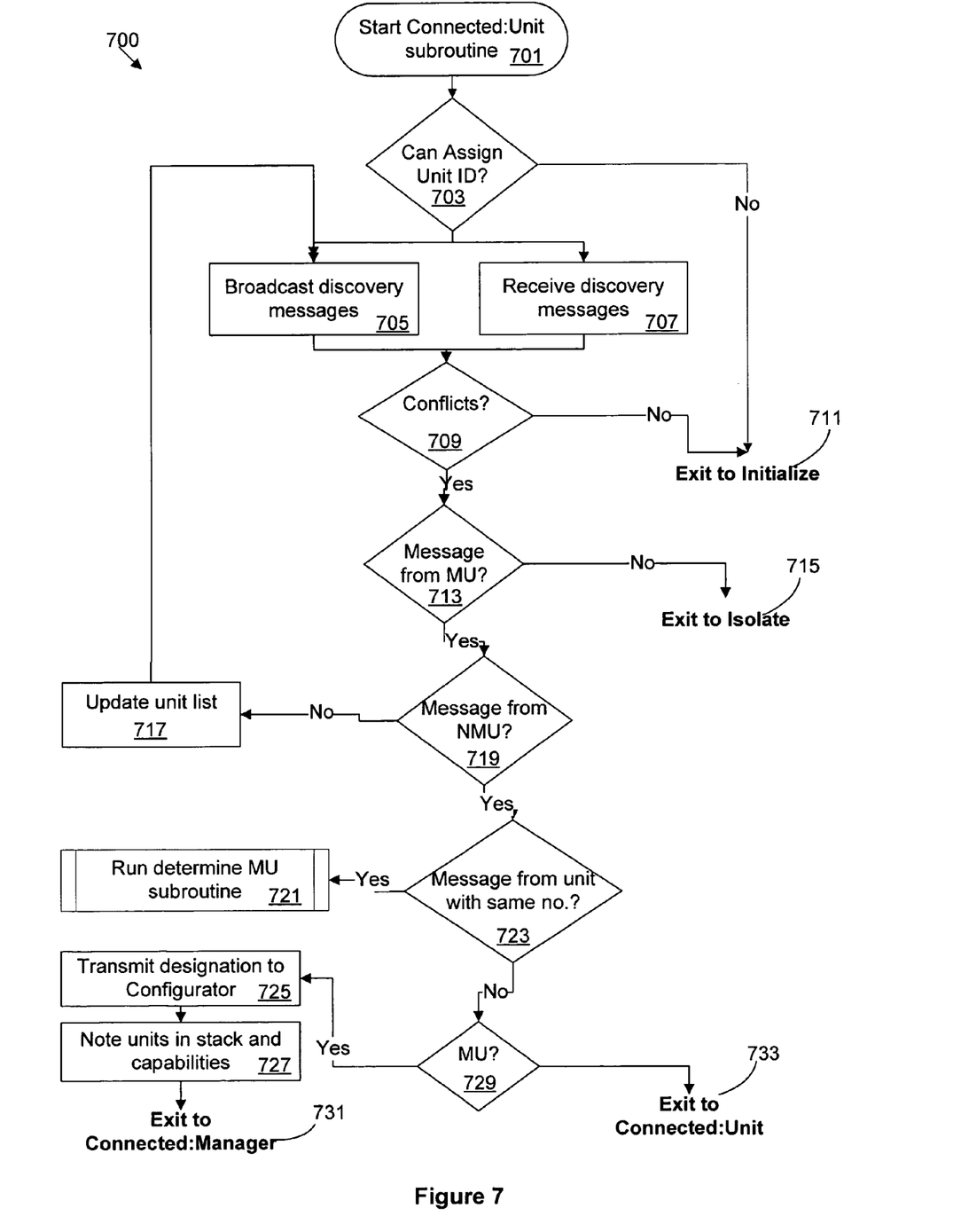
FIG. 7 is a flowchart of a subroutine associated with operation of a unit in the Connected:Unit state.

FIG. 7 is a flowchart illustrating the subroutine 700 for operation of a non-Management Unit in the Connected:Unit state 388 (from FIG. 3). In the Connected:Unit state 388, the unit 270 has connectivity to the stack and is communicating with the Management Unit (e.g. component 222, of FIG. 2A). Once the subroutine 700 begins at block 701, at block 703 it determines if a unique Unit ID can be assigned to the unit 270. If a Unit ID cannot be assigned, the unit leaves the Connected:Unit state 388 and enters the Initialize state 382, at block 711. If a Unit ID can be assigned, however, the unit 270 next transmits and receives discovery messages to and from other units in the stack, shown at blocks 705 and 707, respectively. Discovery messages are sent every T.tx seconds. Additionally, the unit 270 waits for up to T.rx seconds to receive a unit discovery message. As stated above, the time period T.tx can be a multiple of T.rx. After the discovery message stages at blocks 705 and 707, at block 709 the Connected:Unit subroutine 700 conducts a unit conflict check. A conflict occurs when either a discovery message with contact-yield is received from the Management Unit, or if a Unit ID cannot be assigned, e.g. if the Unit ID conflicts with the assigned Unit ID of other units in the stack. In the event that a conflict is found by the determination at block 709, the subroutine proceeds down the "yes" path to block 713. If no Unit ID conflicts exist, the "no" path is followed and the unit leaves the Connected:Unit state 388 and enters the Initialize state 382, at block 711.

At block 713 if the unit has failed to receive any messages from the Management Unit for the stack after T.rx seconds, it leaves the Connected:Unit state 388 and enters the Isolated state 384, at block 715. If at block 713 a discovery message has been received from the Management Unit, however, the subroutine 700 determines at block 719 if any messages have been received from non-Management Units.

At this point, block 719, if the unit has not received any messages from non-Management Units, the list of known units in the stack is updated at block 717 and the unit remains operating in the Connected:Unit state 388, looping back to blocks 705 and 707 to again broadcast and receive messages discovery messages. If at block 719 a message has been received from a non-Management Unit, and the message was sent by a unit having the same Unit ID according to the determination performed at block 723, then the unit 270 enters the Determine MU subroutine 721 to resolve the conflict (see FIG. 5). If there are no Unit ID conflicts found at block 723 however, the subroutine 700 proceeds to block 729, where a Management Unit determination is performed.

If the unit is a Management Unit according to the determination at block 729, the "yes" path is followed to block 725, where the unit notifies the configurator (Initializer) 278 of its Management Unit status. All units in the stack and their capabilities are noted at block 727, and the unit then leaves the Connected:Unit subroutine 700 and enters the Connected: Manager state 386 at block 731. If the unit is not a Management Unit according to the determination at block 729, it remains in the Connected:Unit state 388 shown at block 733.

FIG. 8 is a flowchart illustrating the subroutine 800 for operation of a unit in the Connected:Manager state 386 (FIG. 3). In the Connected:Manager state 386, the unit 270 performs the Management Unit function for the stack.

Once the Connected:Manager subroutine begins at 801, it determines at block 805 if a unique Unit ID can be assigned. If it cannot be assigned, the unit 270 leaves the Connected: Manager state 386 and transitions into the Initialize state 382 at block 821. If a Unit ID can be assigned, however, the subroutine 800 moves to the move management function at block 803. The network administrator can change or select a new management unit by executing a move management function.

On the "yes" path following block 803, the unit 270 leaves the Connected:Manager state 386 and transitions into the Isolated state 384, shown at 807. On the "no" path, from block 803, the units currently active in the stack are verified at 809 and at 811 the Card Manager is informed about non-Management Units in the stack, if necessary.

Next at blocks 813 and 815, respectively, the unit 270 broadcasts unit discovery messages to other units every T.tx seconds, and also receives unit discovery messages from other units after waiting up to T.rx seconds. Following these steps, at block 819, if no messages have been received from other units, the subroutine proceeds to block 817, where it determines if a non-Management Unit is not responding, e.g. a unit has become disabled or otherwise disconnected from the stack. If it is the case that a unit is not responding, the Card Manager is notified accordingly, at block 823, and the Connected:Manager subroutine 800 begins again. If it is determined at block 819 that a message has been received, the subroutine 800 then determines if the message originated from a non-Management Unit, at block 827.

If at block 827 the message did originate from a non-Management Unit, the "yes" path is followed to block 825. If the message did not originate from a non-Management Unit, however, the "no" path is followed to block 829. At block 825 the subroutine 800 determines if the non-Management Unit which sent the message is a new non-Management Unit. If the message did come from a new non-Management Unit, the subroutine proceeds down the "yes" path to block 831, where any unit conflicts are resolved, the Card Manager is notified of the new unit, and the subroutine loops back to the beginning, to block 805. If at block 825 the subroutine 800 determines that the non-Management Unit is not new, the "no" path is followed, where the subroutine returns to the beginning, to block 805, and the unit 270 remains in the Connected:Manager state 386.

Yield (e.g., conflict-yield) is determined at block 829. If "Yes", then at block 821 the unit 270 exits from the Connected:Manager state 386 and transitions into the Initialize state 382. If "No", the unit 270 remains in the Connected:Manager state 386 and the subroutine returns to block 805.

FIG. 9 illustrates the contents of a sample discovery message 900. As described above, the discovery message is protocol variable, which contains unit information pertaining to all fields retrieved by the Unit Manager (e.g., Unit Manager 274, FIG. 2B).

The first field of the discovery message 900 is the Unit ID field 903, which contains the unit identification number (Unit ID) for the unit. As stated above, the Unit ID is a unique value that identifies a unit in a stack, which may be pre-set in non-volatile memory or may initially be unassigned. The unit type, shown in field 905, identifies the type of unit in terms of a number assigned by the vendor. As an example, a value of 25488 may mean that the front panel unit has 24 Gigabit Ethernet ports.

Field 908 contains Type Idx, which is the unit locator number, which allows easy search of the information of a unit represented by the Unit ID. Management Unit (MU), shown in field 909, is a flag indicating whether a particular unit is the Management Unit; it may be pre-set in the same manner as the Unit ID.

Administrative Management Preference (AMP), shown in field 911, is a value used to determine which unit is the Management Unit. A network administrator can assign this value as UNASSIGNED, DISABLE, or from a numerical value from 1-15, a 1 being the lowest chance to become a Management Unit and 15 being the highest. If the setting for a particular unit is UNASSIGNED, other variables will be used to resolve conflicts over Management Unit priority. A unit assigned the DISABLE value cannot be the Management Unit. Field 913 contains the Hardware Management Preference (HMP), a protocol variable set by the vendor. If the AMP value is not assigned, the HMP value is used to resolve conflict among multiple units for Management Unit priority (see description for the Determine MU subroutine of FIG. 5).

Field 915 contains the Model ID information (MID), the model number assigned to a unit by vendor. Shown in field 918 is UD, which denotes a fixed unit, and field 921 contains the CD information, denoting a chassis.

Detected-Code-Version-Flash (DCVF) may be included in field 923 of the discovery message 900, and field 925 corresponds to Detected-Code-Version-Running (DCVR). The MAC address of the discovery message sender (UMAC) is shown in field 928, and CUN in field 931 denotes last completed. On the right side fields of the sample discovery message 900, IC 933 denotes Isolated transition, and MM 935 denotes the move management function. DCVF indicates the version of the firmware. The MU uses this to decide if it needs to update the unit represented by unit ID with correct code version. UMAC (Unit MAC) indicates the unit's WMC address. This is used by Management Units to solve conflicts during the selection of the Management Unit. CUN (Current Unit Number) indicates the unit ID that was last used by the unit represented by Unit Id. IC (isolated) indicates that the unit represented by the unit Id has transition to isolated. MM (move management) indicate that a Management Unit will be reassigned due to network administrator intervention.

While various embodiments of the invention have been described, it may be apparent to those of ordinary skill in the art that many more embodiments and implementations are possible that are within the scope of this invention. For example, while illustrated with advertising commissions, the invention is applicable to any type of commissions. All such modifications are intended to be included within the scope of this disclosure and the present invention and protected by the following claims.

We claim:

1. A component identification system comprising:
a plurality of units configured to connect a plurality of electronic components, the plurality of units being configured as a stack, wherein each unit comprises a card manager configured to determine which of the plurality of electronic components are connected to the unit and a unit manager configured to manage operations of the unit, including the plurality of electronic components connected to the unit; and
a virtual backplane connecting the plurality of units to form the stack, wherein:
at least any one of the plurality of units is designated as a management unit upon activation of the virtual backplane, and
the unit designated as the management unit is configured to control information transfer among the plurality of units of the stack using the virtual backplane, including controlling ports of the other units and managing network protocol packet handling.

2. The component identification system of claim 1 wherein the plurality of units comprise at least one of a modular chassis or a fixed unit.

3. The component identification system of claim 2 wherein the modular chassis is configured to connect to one or more of the electronic components, wherein the one or more electronic components are replaceable.

4. The component identification system of claim 1 wherein the plurality of units comprise a stack including a second plurality of units connected by a second virtual backplane.

5. The component identification system of claim 1 wherein each of the plurality of units include slots for a plurality of cards, each card configured to connect to one or more of the plurality of electronic components.

6. The component identification system of claim 5 wherein the card manager is configured to manage the slots, including being configured to determine which of the plurality of cards are connected to one or more of the electronic components.

7. The component identification system of claim 1 wherein the unit manager resides in an initialize state, isolated state, connected:manager state or connected:unit state.

8. The component identification system of claim 1 wherein the plurality of units transmit and receive, via the virtual backplane, a discovery message comprising a unit ID and a management unit flag.

9. The component identification system of claim 8 wherein the management unit flag indicates whether a unit is functioning as the management unit.

10. The component identification system of claim 8 wherein the discovery message further comprises one or more of the following: a unit type, a unit locator (Type Idx), an administrative management preference (AMP), a hardware management preference (HMP), model ID information (MID), a fixed unit flag (UD), a chassis unit flag (CD), a detected-code-version-flash (DCVF) indicating a firmware version, a detected-code-version-running (DCVR), a MAC address of a sender of the discovery message (UMAC), a current unit number (CUN) indicating the unit ID, an isolated transition (IC) flag indicating an isolated state, and a move management (MM) flag indicating the management unit will be reassigned based on an administrative preference, wherein the discovery message provides one or more capabilities of each of the plurality of units.

11. The component identification system of claim 1 wherein the virtual backplane includes a 10 gigabit Ethernet cable.

* * * * *